July 13, 1965  H. REDLICH  3,194,896

STEREOPHONIC TRANSDUCER WITH ADJUSTABLE FEEDBACK COILS

Filed Jan. 8, 1962  2 Sheets-Sheet 1

INVENTOR
Horst Redlich

BY George H. Spencer

ATTORNEY

United States Patent Office 3,194,896
Patented July 13, 1965

3,194,896
STEREOPHONIC TRANSDUCER WITH ADJUSTABLE FEEDBACK COILS
Horst Redlich, Berlin-Wilmersdorf, Germany, assignor to Teldev Telefunken-Decca Schallplatten G.m.b.H., Hamburg, Germany
Filed Jan. 8, 1962, Ser. No. 164,945
Claims priority, application Germany, Jan. 13, 1961, T 19,533
4 Claims. (Cl. 179—100.41)

The present invention relates generally to the sound recording art, and, more particularly, to disc cutting apparatus for forming grooves in discs, which grooves carry information significant of sound.

In recording stereophonic sound on discs, the recording or cutting stylus is deflected in an imaginary plane perpendicular to the groove tangent, which is the deflection plane. The directions of deflection corresponding to the two signals are arranged to be at right angles to each other in order to obtain as great a decoupling as possible of the two signal channels with respect to each other. Conventionally, the recording of the two signals is performed in such a manner that the recording positions are at angles of +45° and −45° relative to the turntable surface or the surface of the disc.

A disc cutter or cutterhead for forming a grooved sound track having two signals wherein an electro-mechanical or drive transducer is associated with each signal and drives the recording or cutting stylus holder is already known. Each transducer is coordinated with one of the two signal channels in such a manner that the vertical or hill-and-dale recording components are basically translatory components, whereas the lateral recording components are basically rotational components of the motion of the recording stylus holder and the movable parts of the above-mentioned transducers about an axis of rotation which is at right angles to the deflection plane and disposed at some distance from the tip of the stylus. This is shown in German Auslegeschrift No. 1,063,821.

In this known cutterhead, a separate feedback member is coordinated with each signal channel. Each includes an electro-mechanical transducer or feedback transducer for deriving for the feedback an electric magnitude or value representing the resulting deflections in each of the directions corresponding to the recording positions. In order to maintain the influence of elastic deformation of the recording stylus as small as possible, the feedback transducers are disposed near the tip of the stylus. In the known cutterhead, the movable parts of the feedback transducers are similar to the coil assembly acting as the drive transducers and may be considered a reduced image of the latter. The drive transducers and the feedback transducers are disposed with their coil planes parallel and therefore special precautionary measures must be taken in order to reduce the existing and natural inductive coupling between the drive transducers and the feedback transducers to a proper operating level.

In order to reduce this inductive coupling, a considerable expense is involved. It is necessary to shield the magnetic field of the drive transducers by means of thick, short-circuit windings of copper, which are located in the vicinity of the tip of the stylus near the feedback transducers.

A cutterhead is also known which is used for single channel vertical recording wherein the winding plane of the single feedback coil is arranged in the vicinity of the stylus tip and is oriented at right angles to the winding plane of the drive coil, in order to reduce the mutual inductive coupling between the coils as much as possible. The feedback coil is in the form of a flat coil which is arranged so that a line which is parallel to the direction of deflection passes through the stylus tip and forms the center line of the coil. This method of decoupling the inductive feedback transducer by special positioning with respect to the inductive drive transducer cannot be readily applied in cutterheads which are intended for stereophonic recording due to some different conditions which are present in the latter.

In stereophonic recording, two feedback transducers are provided and arranged so that each responds essentially to stylus deflections in a certain definite direction only, but essentially is non-responsive to deflections in a direction at right angles thereto. For this purpose, the feedback transducers in the cutterhead for stereophonic recording are designed as coils having a certain or definite type of winding within a ring-shaped magnetic gap having conical boundary surfaces.

This requirement for exclusive sensitivity of the feedback transducers to a definite deflection direction is not the only demand which must be satisfied in designing a stereophonic recording arrangement. When coils are used as the transducer elements, the feedback transducer for each channel must be sufficiently decoupled from the other feedback transducer, as well as being decoupled from the drive transducer. This is a condition which is particularly difficut to fulfill because the movable parts of the feedback transducers should be arranged in the immediate vicinity of the stylus tip.

With these defects of the prior art in mind, it is a main object of the present invention to provide a cutterhead for creating grooved stereophonic sound recordings and wherein there is proper decoupling of the feedback transducers relative to the drive transducers as well as relative to each other.

Another object of this invention is properly to decouple the transducers in a cutterhead wherein the motion of the recording stylus holder has vertical recording translatory components and lateral recording rotational components and wherein special conditions arise because the lateral recording components and the vertical recording components form resultants at different points on the movable holder at different angles.

Still a further object of this invention is to provide apparatus of the type mentioned which is simple, and has favorable characteristics with respect to oscillation and resonant frequencies.

Yet a further object of this invention is to provide a cutterhead wherein the movable parts of the feedback transducers are easily accessible and exactly adjustable along the desired effective neutral direction.

A still further object of this invention is to provide a device of the type described wherein the movable portions of the feedback transducers are only minimally affected due to the thermal effect of the heavy load drive transducers.

These objects and others ancillary thereto are accomplished according to preferred embodiments of the invention, wherein each of the two feedback transducers including the portions thereof which are used in converting energy, are disposed entirely on one side externally of the area of the straight line which is parallel to the vertical recording component and which passes through the stylus tip. Each transducer is shifted by such an angle $\beta$ relative to the 45° deflection direction of the signal corresponding to the other transducer with reference to the stylus tip, that the electric magnitude of the signal excited in this transducer becomes a minimum.

Due to the arrangement of the movable portions of the feedback transducers externally of the region of the center of the holder, these portions are easily accessible and are outside the area of thermal effects and will therefore not be unduly heated. These transducers may be positioned along the desired effective direction by simple manipulation and may be disposed at a sufficient distance from each other properly to decouple the members relative to each other in the event that these elements depend upon magnetic or electric fields. However, due to the arrangement of the feedback transducers outside of the previously used axial position of the transducers in the center of the holder, there is the necessity of providing a correction of the effective direction of the feedback transducers. The geometric relationships which illustrate this point will be discussed in further detail below. Due to this latter point, however, another feature of the invention is to shift the effective direction by an angle $\beta$ which is such that the electric magnitude or signal which is excited in the transducer for the motion corresponding to the other signal becomes a minimum value.

In a preferred embodiment of the cutter assembly according to the present invention, the movable holder which carries the recording stylus is provided with at least one lug which may be a fin-like member disposed in the vicinity of the recording stylus and extending in the direction of the deflection plane. This fin preferably encloses the deflection plane, and a movable part of the feedback transducer is fastened to this lug. Preferably, two of these lugs are arranged, one on each side of the recording stylus, and may be designed as thin plates. The material of which these plates may be constructed should be one which possesses a large modulus of elasticity and has a small specific weight. Substances exhibiting these characteristics are, for example, ceramic substances, which have a high velocity of sound propagation.

The movable parts of the feedback transducers are flat or pancake coils having windings which correspond or at least approximately correspond to the plane of motion passing through the stylus tip, and which coils are fastened to the lug or lugs. The active windings of these coils are preferably linear and are arranged in the air gap of a magnet system, while the connections between the ends of the linear portions of the windings lie substantially outside of the magnetic field of the magnet system. Thus, the direction of the linear winding portions determines the direction of motion at which substantially no voltage will be introduced in the corresponding flat or pancake coils. Only motion components of the linear winding portions which are disposed at right angles thereto will create induced voltages in the coil.

Additional objects and advantages of the present invention will become apparent upon consideration of the following description when taken in conjunction with the accompanying drawings in which.

Figure 1:
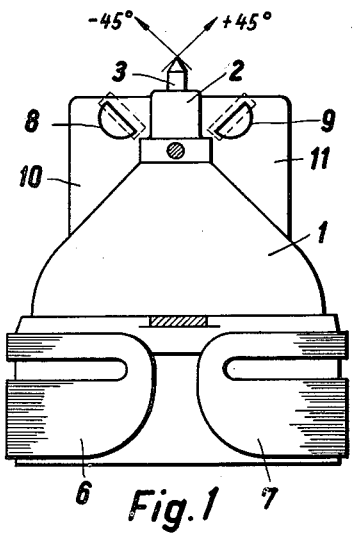
FIGURE 1 is a front elevational view, partly in section, of the assembly of the present invention.
Figure 2:
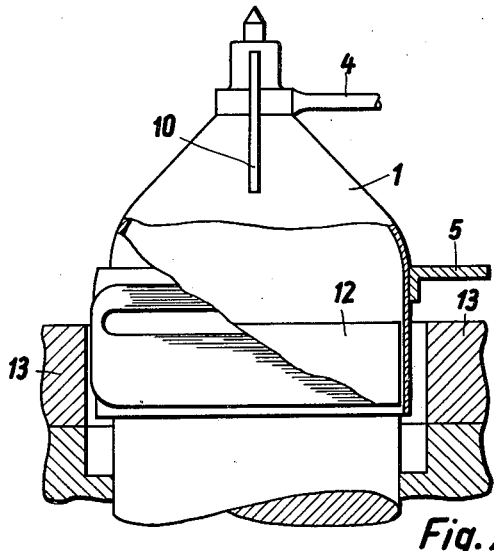
FIGURE 2 is a side view of the cutterhead of FIGURE 1 with parts being shown in section.
Figure 3:
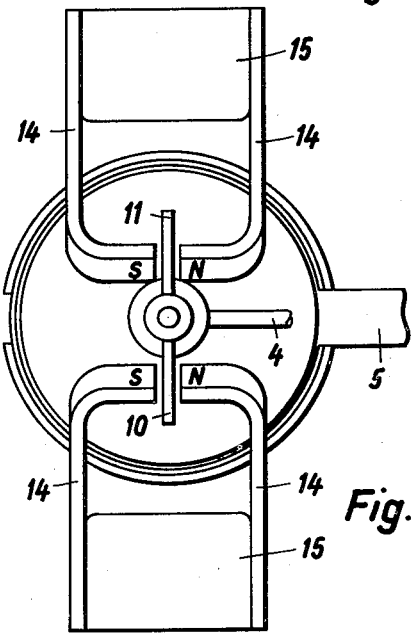
FIGURE 3 is a plan view of the cutterhead illustrated in FIGURES 1 and 2.

In FIGURES 1 through 3, all parts which are not necessary for illustrating the present invention have been omitted for the sake of clarity. With more particular reference to the drawings, a movable body or armature 1 of the cutterhead is in the shape of a rigid and thin-walled bell to which the stylus holder 2 is fastened. The recording stylus 3 is held by the stylus holder 2. The movable body 1 is mounted for movement by springs 4 and 5 the ends of which are firmly clamped to the housing of the disc cutter (not shown). Such a mounting permits purely translatory motions in the direction of the axis of symmetry of the movable parts. In this arrangement the springs 4 and 5 are deflected in the same direction and thus in phase. However, such a mounting also makes possible rotational movement of movable body 1 about an axis of rotation disposed near the leaf spring 5 by which the leaf spring 5 is tensioned while the rod-like spring 4 is subjected to lateral flexing.

Coils 6 and 7 are the drive transducers for the two signal channels. Each coil is wound about substantially one-half the circumference of body 1 and the active portions of the windings of these coils are disposed in the air gap between the magnet core 12 and the ring 13. The driving movement by which such coil devices are used to control the stylus in a disc cutter is known per see and therefore will not be discussed in detail. By appropriately designing the coils and the elements effecting the elastic holding or mounting forces, the arrangement will be such that, with excitation solely of coil 6, the tip of the recording stylus moves in the direction of the $+45°$ arrow indicated in FIGURE 1, while, when coil 7 alone is excited, the tip of the stylus will be moved along the direction of the $-45°$ arrow.

Pancake or flat coils 8 and 9 serve as the feedback transducers and are provided with windings which are semicircular in shape. Only the linear winding portions lying within the gap between the pole shoes 14 of the two magnet systems which are excited by the bar magnets 15 are active. The circular portions of the coils, or the circularly arranged conductors between the ends of the linear winding portions, are disposed outside of the air gap of the magnet system and therefore contribute nothing to the inductance of voltage within the feedback coils.

The pancake coils 8 and 9 are mounted on the plate-like lugs 10 and 11, which, in turn, are connected to opposite sides of movable body 1 and in close proximity to the tip of the stylus. Since movements of body 1 may only take place within the deflection plane which is determined by the mounting springs 4 and 5, and this plane coincides with the plane of the lugs 10 and 11, neither the lugs nor the coils 8 and 9 are subjected to laterally directed inertia forces. Therefore, the moment of resistance of lugs 10 and 11, and of the coils carried thereby, in the direction of motion of the system is very great. Because of this, great rigidity is achieved with respect to the direction of motion and with a minimum of expenditure of material.

Even though the two coils 8 and 9 are disposed in the immediate vicinity of the tip of the stylus, they are never theless, to a large extent, decoupled with respect to one another because the distance between the two coils is sufficient for this purpose. Too, the presence of the stylus holder 2, which is generally formed of aluminum and which is disposed between the two coils, contributes to this decoupling. With the planes of the coils 8 and 9 being disposed at right angles to the winding plane of the coils 6 and 7, good decoupling of the feedback coils with respect to the drive coils is obtained. The positions of coils 8 and 9 and the position of the linear portions of the windings may be adjusted to the desired effective direction without difficulty since the coils are disposed outwardly of body 1 and are freely accessible on lugs 10 and 11.

The proper adjustment of the linear portions of the windings of coils 8 and 9 to the correct angle which results in decoupling at the point of mounting relative to the deflection direction of the other channel may be ascertained empirically by tests. For example, in order to adjust coil 9, the movable body 1 is excited by feeding the drive coil 6 by means of the left channel to provide for movements of the tip of the stylus along a $+45°$ line. The coil 9 will then be adjusted to the angle at which the voltage induced in the coil is a minimum. A corresponding procedure is used for the coil 8 with the movable system being excited solely by the coil 7.

Figure 4:
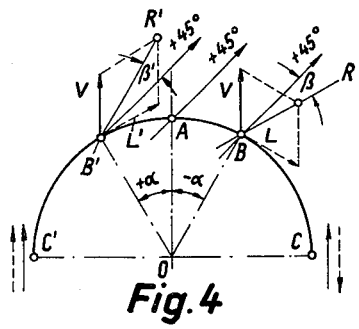
FIGURE 4 is a diagrammatic view analyzing the geometry of the present invention and indicating a need for correction.
Figure 5:
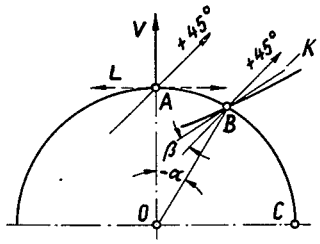
FIGURE 5 is a diagrammatic view similar to FIGURE 4.

However, the correct angular position may also be obtained from analyzing the geometric relations of motion. In FIGURES 4 and 5, the deflection plane of the movable body 1 is the same as the plane of the drawing. The vertical recording components of the deflection are designated V while the lateral recording components are designated L. In order more clearly to distinguish the lateral components from the vertical components, they are designated by arrows having broken lines whereas the vertical components have solid lines.

Point A is the location of the tip of the stylus in the rest position while points B and B' indicate the center line of the linear portions of the windings of the coils 8 and 9, respectively. Point O indicates the position where the axis of rotation for the lateral recording components passes through the drawing plane, and thus the point about which the tip of the stylus appears to move. The points B and B' are disposed at angles $-\alpha$ and $+\alpha$ with respect to the center line or the line along the tip of the stylus when it is at the rest position, and thus the line connecting points O and A. With respect to points C and C', the angular distance to the line OA is 90°. At these points the vertical recording component V and the lateral recording component L have equal magnitude and opposite direction where the movement of the stylus tip is along the $+45°$ line on the right side of the drawing. On the left side of the drawing they have equal magnitude and the same direction. With such a motion the point C would thus remain stationary.

In FIGURE 4, neglecting the translatory motion of the point of rotation O, the angle $\beta$ is approximately determined as the angle between the 45° line passing through the point B, i.e., the line parallel to the 45° line passing through point A, and the resultant R of the parallelogram of the motion components. These motion components are the translatory component or vertical component V and the rotational lateral component L. When the point O is considered as stationary, the error which results from angle $\beta$ is relatively small as long as points B and B' are chosen to be small angles $-\alpha$ and $+\alpha$ relative to the line connecting points O and A. As indicated in FIGURE 4, a positive correction angle $\beta$ or a negative correction angle $\beta'$ is provided depending upon the position of the feedback coil B or B', if reference is made to the $+45°$ line and thus to the drive coil 6 of FIGURE 1. Ascertaining the correct angle for drive coil 7 of FIGURE 1 and thus for motion of the stylus tip A on the $-45°$ line is performed in the same manner, but is not indicated in FIGURE 4.

If, now, the analysis is to be considered wherein the translatory motion of point O corresponding to the vertical recording component is considered, then a curve K may be formed, along which the point B moves during the deflection process along a 45° line. The correction angle $\beta$ is determined as the angle between the 45° line passing through the point B, which 45° line is coordinated with the signal channel to be considered, and the tangent of the curve K at point B. This curve K is formed by the movement of point B by sliding the triangle A–B–O with point O on the straight line A–O, and with the point A on the 45° line passing through point A. This construction is illustrated in FIGURE 5, but only for the position of feedback coil 9 at point B. Thus, motion of the stylus tip A along a $+45°$ line is considered, and for the other positions of the feedback coil, i.e., motion along the $-45°$ line, the construction is performed basically in a similar manner.

Figure 6:
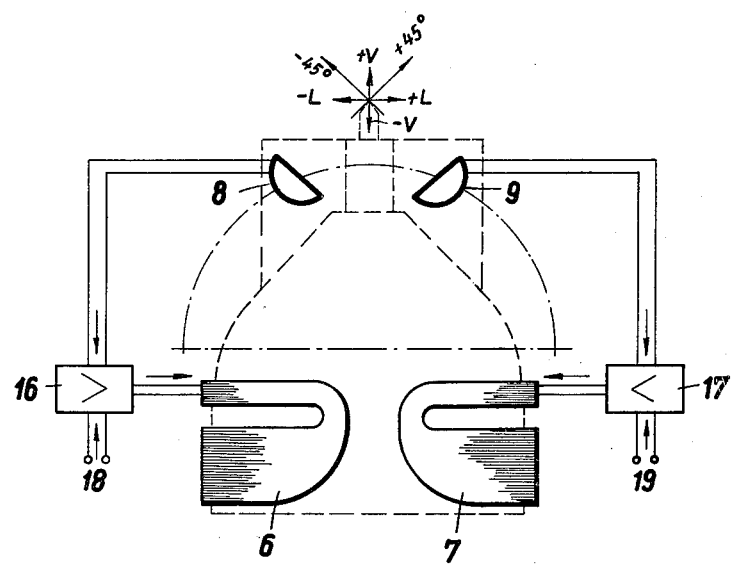
FIGURE 6 is a circuit diagram illustrating the connection of the feedback coils to amplifiers and to the drive coils.

With more particular reference now to FIGURE 6, the connection of the feedback coils 8 and 9 via coordinated amplifiers 16 and 17, with the drive coils 6 and 7, is illustrated. Each of the amplifiers 16 and 17 is provided with two inputs. At the inputs designated 18 and 19, the signal voltages of the corresponding channel are made effective. With the exception of the effects, obtained from the special arrangement and design of the feedback coils 8 and 9 of the present invention, the arrangement of FIGURE 6 operates in the same manner as known cutterheads mentioned earlier and which are provided with feedback transducers. Accordingly, a detailed description of its mode of operation is not necessary, and reference is made to German Auslegeschrift 1,063,821.

It will be understood that the above description of the present invention is susceptible to various modifications, changes, and adaptations, and the same are intended to be comprehended within the meaning and range of equivalents of the appended claims.

What is claimed is:

1. A cutterhead for forming a grooved, stereophonic sound recording, comprising, in combination:
   (a) an armature;
   (b) a stylus holder on said armature and having a stylus mounted therein;
   (c) means for mounting said armature and thus said stylus for movement in a plane;
   (d) a drive transducer means for coordination with each of two signal channels and having parts thereof arranged on said armature and cooperating with said mounting means for moving the tip of said stylus in said holder through said plane which is disposed at right angles to the tangent of a groove of a recording, the movement being at angles of $+45°$ and $-45°$ respectively corresponding to two recording positions, relative to the surface of a recording support and with vertical components which are essentially translatory and lateral components which are essentially rotational, the movement being about an axis of rotation disposed at right angles to the deflection plane and remote from the tip of said stylus;
   (e) a feedback transducer means electrically associated with each drive transducer means and including a flat coil having a winding plane at least approximately corresponding to the plane of movement passing through the stylus and each disposed in the vicinity of the tip of said stylus for deriving for the feedback an electric magnitude representative of the resulting deflections in each of the directions corresponding to the recording positions, said feedback transducer means being arranged to respond only to stylus deflections in a certain direction but essentially not responding to deflections in a direction perpendicular thereto, said feedback transducer means having parts serving for energy conversion and lying each entirely on a respective side externally of the region of a straight line parallel to the vertical recording component and passing through the tip of said stylus and being arranged at an angle ($\beta$) relative to the 45° deflection direction with reference to the stylus tip and of the signal of the other feedback transducer which assures that the electric magnitude of this signal excited in said transducer means is a minimum; and
   (f) at least one lug connected to said armature in the vicinity of said stylus and substantially entirely extending in the deflection plane, the feedback transducer means being mounted on said lug.

2. A cutterhead as defined in claim 1, wherein two lugs are provided, one arranged on each side of the recording stylus and each being in the form of a thin plate.

3. A cutterhead as defined in claim 1, comprising magnet systems adjacent said armature, said flat coils having active linear winding portions disposed in the air gaps of said magnet systems, the connections between the ends of said linear winding portions being disposed substantially outwardly of the magnetic fields of said magnetic systems.

4. A cutterhead for forming a grooved, stereophonic sound recording, comprising, in combination:
   (a) a thin walled bell shaped armature;
   (b) a stylus holder of said armature and having a stylus mounted therein;

(c) means mounting said armature and thus said stylus for rotational and translatory movements in a deflection plane;

(d) first and second drive transducer means for coordination with a respective one of two signal channels and cooperating with said mounting means for moving the tip of the stylus in said holder through said plane which is disposed at right angles to the tangent of a groove of a recording with the movement being at angles of $+45°$ and $-45°$ respectively corresponding to two recording positions relative to the surface of a recording support and with vertical components which are essentially translatory and lateral components which are essentially rotational about an axis of rotation disposed at right angles to the deflection plane and remote from the tip of the stylus, each drive transducer means having a moving part on said armature and a stationary part arranged for cooperation therewith, each moving part including a coil on a uniform diameter portion of the armature remote from the stylus and extending for slightly less than half the circumference of the armature with the ends of respective coils slightly spaced from one another at positions spaced 90° angularly with respect to the deflection plane;

(e) a thin fin mounted on said armature in the vicinity of the stylus and substantially entirely disposed in said deflection plane; and (f) first and second feedback transducer means each electrically connected with a respective drive transducer means and disposed in the general vicinity of but spaced from the tip of the stylus for deriving feedback signals representative of the resulting deflections in each of the directions corresponding to the recording positions, each transducer means having a moving part on said fin and a stationary part arranged for cooperation therewith, each moving part including a flat coil disposed in the deflection plane and in its entirety spaced laterally to one respective side of a straight line parallel to the vertical recording component and passing through the stylus, said flat coils having linear effective portions disposed at angles slightly different from the resultant stylus movement directions of $+45°$ and $-45°$ respectively and which approximately correspond to the resultant movement direction of a mid-point of the respective coils.

References Cited by the Examiner

UNITED STATES PATENTS 2,962,561   11/60   Redlich et al. _____ 179—100.4

IRVING L. SRAGOW, *Primary Examiner.*

BERNARD KONICK, *Examiner.*

UNITED STATES PATENT OFFICE
CERTIFICATE OF CORRECTION

Patent No. 3,194,896                                        July 13, 1965

Horst Redlich

It is hereby certified that error appears in the above numbered patent requiring correction and that the said Letters Patent should read as corrected below.

In the grant, lines 2 and 12, and in the heading to the printed specification, line 5, for "Teldev Telefunken-Decca Schallplatten G.m.b.H.", each occurrence, read -- Teldec Telefunken-Decca Schallplatten G.m.b.H. --; column 6, line 74, "of" read -- on --.

Signed and sealed this 18th day of January 1966.

(SEAL)
Attest:

ERNEST W. SWIDER                                    EDWARD J. BRENNER
Attesting Officer                                          Commissioner of Patents